United States Patent [19]

Tanaka et al.

[11] Patent Number: 5,633,320
[45] Date of Patent: May 27, 1997

[54] THERMOPLASTIC POLYESTER RESIN COMPOSITION

[75] Inventors: Yasuo Tanaka; Yohji Hayakawa, both of Ichihara, Japan

[73] Assignee: Mitsui Petrochemical Industries, Ltd., Tokyo, Japan

[21] Appl. No.: 612,876

[22] PCT Filed: Jul. 6, 1995

[86] PCT No.: PCT/JP95/01346

§ 371 Date: May 7, 1996

§ 102(e) Date: May 7, 1996

[87] PCT Pub. No.: WO96/01873

PCT Pub. Date: Jan. 25, 1996

[30] Foreign Application Priority Data

Jul. 8, 1994 [JP] Japan ..................................... 6-157729

[51] Int. Cl.$^6$ ........................................................... C08F 8/00
[52] U.S. Cl. ........................ 525/168; 525/240; 525/437; 525/445
[58] Field of Search ................................. 525/168, 240, 525/437, 445

[56] References Cited

FOREIGN PATENT DOCUMENTS

| | | |
|---|---|---|
| 46-5225 | 2/1971 | Japan . |
| 55-50058 | 4/1980 | Japan . |
| 57-54058 | 11/1982 | Japan . |
| 57-59261 | 12/1982 | Japan . |
| 58-17148 | 2/1983 | Japan . |
| 59-28223 | 7/1984 | Japan . |
| 60-28446 | 2/1985 | Japan . |
| 62-20735 | 1/1987 | Japan . |
| 62-236868 | 10/1987 | Japan . |

*Primary Examiner*—Samuel A. Acquah
*Attorney, Agent, or Firm*—Sherman and Shalloway

[57] ABSTRACT

There is provided a thermoplastic polyester resin composition comprising a thermoplastic polyester resin (A) and a graft modified product (B) of a mixture of two different specific ethylene.1-butene random copolymers in a weight ratio of 95/5 to 50/50. A molded article having excellent impact resistance at low temperatures and mechanical strength can be obtained from this composition.

9 Claims, No Drawings

THERMOPLASTIC POLYESTER RESIN COMPOSITION

This application is a 371 of PCT/JPX5/01346 filed Jul. 6, 1995.

TECHNICAL FIELD

This invention relates to a thermoplastic resin composition which has excellent impact resistance, particularly impact resistance at low temperatures, and toughness against tensile stress at room temperature, and yet loses little rigidity inherent in a polyester resin.

BACKGROUND ART

Thermoplastic polyesters such as polybutylene terephthalate have been and are attempted to be used in some of machine parts, parts of electric appliances and auto parts as engineering plastics, making use of their excellent properties such as mechanical strength, rigidity, heat resistance, chemical resistance and oil resistance. However, since thermoplastic polyesters such as polybutylene terephthalate are inferior to polycarbonates in impact resistance in spite of the above excellent properties, proposals have been made to improve their impact resistance.

As exemplary means of improving the impact resistance of thermoplastic polyesters, there are proposed a method in which a polyester is mixed with ethylene.propylene rubber, polyisobutene or polybutene (JP-B-46-5225), a method in which a thermoplastic polyester is melt mixed with a modified ethylene polymer having a crystallinity of 75% or less obtained by graft polymerizing α,β-unsaturated carboxylic acid or a derivative thereof (JP-B-57-54058, JP-B-57-59261), and a composition comprising a thermoplastic polyester and a specific ethylene.α-olefin random copolymer having a polar group obtained by graft-polymerizing a derivative of α,β-unsaturated carboxylic acid or unsaturated epoxide (JP-B-59-28223). However, the former method is insufficient in impact resistance-improving effect because the polyester has poor compatibility with the ethylene.propylene rubber. Although the latter two methods improve impact strength, its improvement is still insufficient, and in order to obtain sufficient impact strength, it is necessary to increase the amount of a flexible resin composition to be melt kneaded with a polyester, by which rigidity inherent in a thermoplastic polyester is lost.

Further, a composition obtained by melt mixing a thermoplastic polyester with a modified ethylene polymer prepared by graft polymerizing α,β-unsaturated carboxylic acid or a derivative thereof is inferior in toughness against tensile stress to a polyester which does not contain a modified ethylene polymer.

A composition prepared by adding a copolymer of α-olefin and a glycidyl ester of α,β-unsaturated acid and an ethylene copolymer to a polyester and mixing these (JP-A-58-17148) and a composition prepared by adding an ethylene.α-olefin copolymer obtained by graft polymerizing an unsaturated carboxylic acid or an anhydride thereof and a polyepoxy compound to a polyester and mixing these (JP-A-60-28446) are disclosed as compositions having excellent impact resistance at low temperatures. However, although the impact resistance at low temperatures is significantly improved in these compositions, it is still insufficient in some of their applications. When the amount of a flexible resin composition to be melt kneaded with a polyester is increased to obtain sufficient impact strength, rigidity inherent in the thermoplastic polyester is lost like the above description.

DISCLOSURE OF THE INVENTION

It is therefore an object of the invention to provide a thermoplastic polyester resin composition being excellent in impact resistance, particularly impact resistance at low temperatures, and in toughness against tensile stress at room temperature.

Another object of the invention is to provide a thermoplastic resin composition which does not lose excellent rigidity inherent in a polyester resin so much.

According to the present invention, the above objects and advantages can be attained by a thermoplastic resin composition comprising a thermoplastic polyester resin (A) and a graft modified mixture of an ethylene.1-butene copolymers (B) in a weight ratio of 95/5 to 50/50, wherein (1) the graft modified mixture (B) is essentially composed of (i) an ethylene.1-butene random copolymer (C) which contains units derived from 1-butene in an amount of 5 to 15 mol % and has an intrinsic viscosity [η], measured at 135° C. in a decalin solvent, of 0.5 to 3.5 dl/g, a glass transition temperature (Tg) of −50° C. or less and a crystallinity, measured by an X-ray diffraction method, of less than 40%, (ii) an ethylene.1-butene random copolymer (D) which contains units derived from 1-butene in an amount of 16 to 25 mol % and has an intrinsic viscosity [η], measured at 135° C. in a decalin solvent, of 0.5 to 3.5 dl/g, a glass transition temperature of −50° C. or less and a crystallinity, measured by an X-ray diffraction method, of less than 15%, and (iii) graft units derived from at least one monomer selected from unsaturated carboxylic acids and derivatives thereof and bonded to at least one of the above two copolymers, and (iv) the graft modified mixture (B) contains units derived from 1-butene in an amount of 11 to 19 mol % based on the total of units derived from ethylene and 1-butene and has an intrinsic viscosity [η], measured by the above method, of 0.5 to 3.5 dl/g, a glass transition temperature of −50° C. or less, a crystallinity, measured by the above method, of less than 10% and a density of 0.865 to 0.880 g/cm³;

(2) the amount of the above graft units is 0.01 to 10% by weight based on the total amount of the copolymer (C) and the copolymer (D); and (3) the weight ratio ((C)/(D)) of the copolymer (C) to the copolymer (D) is 10/90 to 95/5.

The present invention will be described in more details hereinafter, and the other objects and advantages of the present invention will become apparent from the description.

Most Preferred Embodiment for Practising the Invention

The thermoplastic polyester resin (A) used in the composition of the present invention is a polyester formed from a unit of a hydroxy compound selected from an aliphatic glycol such as ethylene glycol, propylene glycol, 1,4-butane diol, neopentyl glycol or hexamethylene glycol, an alicyclic glycol such as cyclohexane dimethanol, an aromatic dihydroxy compound such as bisphenol and mixtures of two or more of these, and a unit of a dicarboxylic acid selected from an aromatic dicarboxylic acid such as terephthalic acid, isophthalic acid or 2,6-naphthalenedicarboxylic acid, an aliphatic dicarboxylic acid such as oxalic acid, succinic acid, adipic acid, sebacic acid or undecadicarboxylic acid, an alicyclic dicarboxylic acid such as hexahydroterephthalic acid and mixtures of two or more of these. The polyester may be modified by a small amount of a polyhydroxy compound having a functionality of 3 or more such as tricarboxylic acid or triol, a polycarboxylic acid and the like as far as it shows thermoplasticity.

Specific examples of the thermoplastic polyester resin (A) include polyethylene terephthalate, polybutylene terephthalate, polyethylene isophthalate·terephthalate copolymer and the like, of which polyethylene terephthalate and polybutylene terephthalate are preferred because they have excellent mechanical properties and moldability.

The thermoplastic polyester resin (A) has a molecular weight high enough to produce molded articles, and its melt flow rate (MFR), measured in accordance with ASTM (at 250° C. under a load of 325 g), is preferably 1 to 50 g/10 minutes.

The graft-modified mixture of ethylene.1-butene random copolymers (B) used in the composition of the present invention is consistuted by the ethylene.1-butene random copolymer (C), the ethylene.1-butene copolymer (D) and graft units derived from at least one monomer selected from unsaturated carboxylic acids and derivatives thereof and bonded to at least one of the above two copolymers, which are to be described later.

The copolymer (C) contains units derived from 1-butene in an amount of 5 to 15 mol %, preferably 7 to 13 mol %. The copolymer (D) contains units derived from 1-butene in an amount of 16 to 25 mol %, preferably 18 to 22 mol %. The remaining units contained in these copolymers (C) and (D) are units derived from ethylene.

The glass transition temperatures (Tg) measured in accordance with a DSC method of the copolymers (C) and (D) are respectively −50° C. or less, preferably −55° C. or less.

More preferably, the glass transition temperature (Tg) of the copolymer (D) is −60° C. or less.

The ethylene.1-butene random copolymer (C) has an intrinsic viscosity [η], measured at 135° C. in a decalin solvent, of 0.5 to 3.5 dl/g, preferably 1.5 to 3.0 dl/g.

The ethylene.1-butene random copolymer (D) has an intrinsic viscosity [η], measured at 135° C. in a delcalin solvent, of 0.5 to 3.5 dl/g, preferably 1.5 to 3.0 dl/g.

The crystallinity, measured by an X-ray diffraction method, of the ethylene.1-butene random copolymer (C) is less than 40%, preferably 20% or less.

The crystallinity, measured by an X-ray diffraction method, of the ethylene.1-butene random copolymer (D) is less than 10%, preferably 8% or less.

The above ethylene.1-butene random copolymers can be produced in the presence of a known vanadium-based catalyst or a metallocene-based catalyst.

The graft modified mixture (B) contains the above ethylene.1-butene random copolymers (C) and (D) in a weight ratio ((C)/(D)) of 10/90 to 95/5, preferably 15/85 to 90/10, more preferably 20/80 to 85/15.

And, the graft modified mixture (B) contains units derived from 1-butene in an amount of 11 to 19 mol %, preferably 12 to 18 mol %, based on the total amount of units derived from ethylene and 1-butene, and has an intrinsic viscosity [η] of 0.5 to 3.5 dl/g, preferably 1.0 to 3.0 dl/g, a glass transition temperature of −50° C. or less, preferably −55° C. or less, a crystallinity of less than 10%, a melting point, measured by a DSC method, of preferably 70° C. or less, and a density of preferably 0.865 to 0.880 g/cm$^3$.

The graft modified mixture (B) has units (graft units) formed by graft-polymerizing an unsaturated carboxylic acid or a derivative thereof with at least one of the ethylene.1-butene random copolymers (C) and (D), as described above.

The amount of the graft units is 0.01 to 10% by weight, preferably 0.1 to 5% by weight, based on the total amount of the unmodified copolymers (C) and (D), from a standpoint of excellently maintaining dispersibility of the graft modified mixture (B) into the thermoplastic polyester resin (A).

Illustrative examples of the unsaturated carboxylic acid used herein include acrylic acid, maleic acid, fumaric acid, tetrahydrophthalic acid, itaconic acid, citraconic acid, crotonic acid, isocrotonic acid, nadic acid (endocis-bicyclo [2.2.1]hepto-5-ene-2,3-dicarboxylic acid) and the like.

Illustrative examples of the derivative thereof include acid halide compounds, amide compounds, imide compounds, acid anhydrides and ester compounds of the above unsaturated carboxylic acids. Specific examples are malenyl chloride, maleimide, maleic anhydride, citraconic anhydride, monomethyl maleate, dimethyl maleate, glycidyl maleate and the like. Among these, preferred are unsaturated dicarboxylic acids and anhydrides thereof, particularly preferred are maleic acid, nadic acid, maleic anhydride and nadic anhydride.

The position at which the unsaturated carboxylic acid or derivative thereof is grafted to the ethylene.1-butene random copolymer(s)(C) and/or (D) is not particularly limited, and it may be bonded to any carbon atom of a copolymer constituting the ethylene.1-butene random copolymer.

A variety of methods may be used to produce a graft modified copolymer by graft polymerizing an unsaturated carboxylic acid or a derivative thereof (graft monomer) with an ethylene.1-butene random copolymer.

For example, the above ethylene.1-butene random copolymer is molten and mixed with an unsaturated carboxylic acid for graft copolymerization. Alternatively, an ethylene.1-butene random copolymer is dissolved in a solvent and then subjected to a graft polymerization.

In either case, it is preferred to carry out a graft-reaction in the presence of a radical initiator in order to allow the graft monomer to be efficiently graft polymerized.

In this case, the radical initiator is generally used in an amount of 0.001 to 1 part by weight based on 100 parts by weight of the ethylene.1-butene random copolymer which is a trunk polymer.

Organic peresters and azo compounds can be used as the radical initiator. Specific examples of the radical initiator include benzoyl peroxide, dichlorobenzoyl peroxide, dicumyl peroxide, di-tert-butyl peroxide, 2,5-dimethyl-2,5-di(peroxidebenzoate)hexyne-3,1,4-bis(tert-butylperoxyisopropyl)benzene, lauroyl peroxide, tert-butyl peracetate, 2,5-dimethyl-2,5-(tert-butylperoxide)hexyne-3, 2,5-dimethyl-2,5-di(tert-butylperoxide)hexane; tert-butyl perbenzoate, tert-butyl perphenylacetate, tert-butyl perisobutylate, tert-butylper-sec-ootoate, tert-butyl perpivalate, cumyl perpivalate and tert-butyl perdiethylacetate; azobisisobutylonitrile, and dimethyl azoisobutylate.

Among these, dialkyl peroxides such as dicumyl peroxide, di-tert-butyl peroxide, 2,5-dimethyl-2,5-di(tert-butylperoxy)hexyne-3,2,5-dimethyl-2,5-di(tert-butylperoxy)hexane and 1,4-bis(tert-butylperoxyisopropyl) benzene are preferred.

The temperature of a graft reaction carried out in the presence of the above radical initiator or a graft reaction without using a radical initiator is usually 60° to 350° C., preferably 150° to 300° C.

The graft modified mixture (B) used in the composition of the present invention can be obtained by carrying out a graft reaction on either one of the copolymers (C) and (D) in accordance with the above method, and melt-mixing the resulting graft modified copolymer and an unmodified copolymer. Alternatively, the graft modified mixture (B) can be obtained by preliminarily mixing the copolymers (C) and (D), preferably melt-mixing these copolymers, and subjecting the resulting mixture to a graft reaction. The latter method is preferred.

In the polyester resin composition of the present invention, the above thermoplastic polyester resin (A) and the graft modified mixture of the ethylene.1-butene random copolymers (B) are used in a weight ratio ((A)/(B)) of 95/5 to 50/50, preferably 90/10 to 60/40. When the graft modified mixture of the ethylene.1-butene random copolymers (B) is used within the above range, a thermoplastic polyester composition which is excellent in impact resistance at low temperatures and toughness against tensile stress at room temperature and does not lose excellent rigidity inherent in a polyester resin so much can be obtained.

In addition to the above thermoplastic polyester resin (A) and the graft modified mixture of the ethylene.1-butene random copolymers (B), the thermoplastic polyester resin composition of the present invention may contain as required an antioxidant, ultraviolet absorber, light protector, phosphite stabilizer, peroxide decomposer, basic promoting agent, nucleus forming agent, plasticizer, lubricant, antistatic agent, flame retarder, pigment, dye, and filler such as carbon black, asbestos, talc, silica or silica alumina in ranges not prejudicial to the object of the present invention. Further the thermoplastic polyester resin composition of the present invention may contain other polymer(s) in ranges not prejudicial to the object of the present invention.

The polyester resin composition of the present invention is prepared by melt-mixing in accordance with various known methods. That is, the above components are charged simultaneously or consecutively into, for example, a Henschel mixer, V-type blender, tumbler mixer or ribbon blender, mixed together and then, melt-kneaded by a single-screw extruder, multi-screw extruder, kneader or Banbury mixer.

Among these, when an apparatus having excellent kneading performance, such as a multi-screw extruder, is used, a high-quality polyester resin composition having components uniformly dispersed can be obtained.

The above additives, such as an antioxidant, may be added as required in any stage of the above process.

The polyester resin composition of the present invention thus obtained can be molded into a variety of shapes by various known melt-molding methods such as injection molding, extrusion molding, compression molding, foam molding or the like.

EXAMPLES

To further illustrate this invention specifically, but not by way of limitation, the following examples are given.

EXAMPLE 1

A mixture consisting of 8 kg of an ethylene.1-butene random copolymer (C) having a content of units derived from 1-butene (1-butene unit content) of 11 mol %, an intrinsic viscosity [η], measured at 135° C. in decalin, of 2.25 dl/g, a glass transition temperature, measured by a DSC method, of −58° C., and a crystallinity, measured by an X-ray diffraction method, of 8% and 2 kg of an ethylene.1-butene random copolymer (D) having a 1-butene unit content of 19 mol %, an intrinsic viscosity [η], measured at 135° C. in decalin, of 2.20 dl/g, a glass transition temperature measured by a DSC method of −65° C. and a crystallinity, measured by an X-ray diffraction method, of 2% was blended with 100 g of maleic anhydride dissolved in 100 g of acetone and 6 g of di-tert-butyl peroxide in a Henschel mixer.

The thus obtained blend was fed from the hopper of a single-screw extruder having a screw diameter of 40 mm and an L/D of 26, and extruded into a strand at a resin temperature of 260° C. and an extrusion rate of 6 kg/hour. The strand was cooled by water and pelletized to obtain a maleic anhydride-modified ethylene.1-butene random copolymer mixture. Unreacted maleic anhydride was extracted from the thus obtained graft modified mixture with acetone, and then the graft amount of the maleic anhydride contained in the graft modified mixture was measured. The amount was found to be 0.87% by weight.

The intrinsic viscosity, crystallinity, 1-butene unit content and glass transition temperature of the resulting graft modified mixture are shown in Table 1.

The compositions and physical properties of graft modified mixtures of the subsequent examples are also shown in Table 1.

Thereafter, 80 parts by weight of polybutylene terephthalate [PBT, 1401-X06, manufactured by Toray Industries, Inc., MFR (measured at 250° C. under a load of 325 g): 5 g/10 minutes] and 20 parts by weight of the above maleic anhydride-modified ethylene.1-butene random copolymer mixture in the form of a pellet were mixed together to prepare a dry blend. This dry blend was fed to a twin-screw extruder (L/D=40, 30 mmφ) set at 255° C. to prepare pellets of a polyester composition. The pellets were dried at 120° C. for 24 hours and then injection-molded under the following conditions to prepare a test sample for a physical property test.

Injection-molding Conditions cylinder temperature: 255° C.

injection pressure (primary/secondary): 400/280 kg/cm$^2$ mold temperature: 80° C.

Thereafter, the test sample was evaluated for physical properties by the following method.

Tensile Test

Using a ⅛" thick test sample, stress at break [TS (kg/cm$^2$)] and elongation at break [EL (%)] were measured in accordance with ASTM D638. Toughness against tensile stress was evaluated based on TS and EL values.

Flexural Test

Using a ⅛" thick test sample, flexural modulus [FM (kg/cm$^2$)] was measured in accordance with ASTM D790.

Izod Impact Test

Using a ⅛" thick test sample, notched Izod impact strength was measured at 23° C. and −40° C. in accordance with ASTM D256.

In the above physical property tests, injection molded test samples were permitted to stand at 23° C. for 2 days in a dry state, and then used for testing.

Results are shown in Table 2.

EXAMPLES 2 AND 3

Maleic anhydride-modified ethylene.1-butene random copolymer mixtures were obtained in the same manner as in Example 1 except that the ratio of the copolymer (C) to the copolymer (D) was changed as shown in Table 1. Using the thus obtained maleic anhydride-graft modified mixtures and polybutylene terephthalate, polyester compositions were prepared in the same manner as in Example 1, and test samples were molded by injection molding and measured for physical properties. Results are shown in Table 2.

Comparative Example 1

A test sample was prepared and measured in the same manner as in Example 1 except that only 10 kg of the ethylene.1-butene random copolymer (C) was graft modified with maleic anhydride. Results are shown in Table 2.

Comparative Example 2

A test sample was prepared and measured in the same manner as in Example 1 except that only 10 kg of the ethylene.1-butene random copolymer (D) was graft modified with maleic anhydride. Results are shown in Table 2.

Feasibility of Industrial Utilization

Since the thermoplastic polyester resin composition of the present invention has excellent impact resistance, particularly impact resistance at low temperatures, and excellent toughness against tensile stress and loses little rigidity inherent in a polyester resin, it can be used as a molding material for machine parts, parts of electric appliances and auto parts that require impact resistance at low temperatures.

We claim:

1. A thermoplastic polyester resin composition comprising a thermoplastic polyester resin (A) and a graft modified mixture of ethylene.1-butene copolymers (B) in a weight ratio of 95/5 to 50/50, wherein
   (1) the graft modified mixture (B) is essentially composed of
      (i) an ethylene.1-butene random copolymer (C) which contains units derived from 1-butene in an amount of 5 to 15 mol % and has an intrinsic viscosity [η], measured at 135° C. in a decalin solvent, of 0.5 to 3.5 dl/g, a glass transition temperature (Tg), measured by a DSC method, of −50° C. or less and a crystallinity, measured by an X-ray diffraction method, of less than 40%,
      (ii) an ethylene.1-butene random copolymer (D) which contains units derived from 1-butene in an amount of 16 to 25 mol % and has an intrinsic viscosity [η], measured at 135° C. in a decalin solvent, of 0.5 to 3.5 dl/g, a glass transition temperature (Tg), measured by a DSC method, of −50° C. or less and a crystallinity, measured by an X-ray diffraction method, of less than 15%, and
      (iii) graft units derived from at least one monomer selected from unsaturated carboxylic acids and derivatives thereof and bonded to at least one of the two copolymers, and
      (iv) the graft modified mixture (B) contains units derived from 1-butene in an amount of 11 to 19 mol % based on the total of units derived from ethylene and 1-butene and has an intrinsic viscosity [η],

TABLE 1

(compositions and physical properties of graft modified mixtures)

|  | Comp. Example 1 | Example 1 | Example 2 | Example 3 | Comp. Example 2 |
|---|---|---|---|---|---|
| Mixing ratio of copolymer (D) to copolymer (C) ((D)/(C)) | 100/0 | 80/20 | 50/50 | 30/70 | 0/100 |
| 1-butene units (mol %) | 11 | 13 | 15 | 17 | 19 |
| Intrinsic viscosity [η] (dl/g) | 2.25 | 2.20 | 2.23 | 2.28 | 2.20 |
| Glass transition temperature (°C.) | −58 | −58 | −59 | −60 | −65 |
| Crystallinity (%) | 8 | 7 | 5 | 4 | 2 |
| Amount of MAH grafted (% by weight) | 0.84 | 0.87 | 0.90 | 0.92 | 0.90 |

Note: MAH stands for maleic anhydride.

TABLE 2

(physical properties of the polyester resin composition)

|  | Comp. Example 1 | Example 1 | Example 2 | Example 3 | Comp. Example 2 |
|---|---|---|---|---|---|
| TS (kg/cm$^2$) | 410 | 320 | 270 | 260 | 250 |
| EL (%) | 430 | 300 | 110 | 80 | 60 |
| FM (kg/cm$^2$) | 15,000 | 14,700 | 14,700 | 14,800 | 14,300 |
| IZOD (notched) |  |  |  |  |  |
| 23° C. (kg.cm/cm) | 11 | N.B. | N.B. | N.B. | N.B. |
| −40° C. (kg.cm/cm) | 6 | 8 | 8 | 8 | 9 |

Note: N.B. stands for "not-broken".

measured by the above method, of 0.5 to 3.5 dl/g, a glass transition temperature, measured by the above method, of −50° C. or less, and a crystallinity, measured by the above method, of less than 10%, (2) the amount of the above graft units is 0.01 to 10% by weight based on the total amount of the copolymer (C) and the copolymer (D), and (3) the weight ratio ((C)/(D)) of the copolymer (C) to the copolymer (D) is 10/90 to 95/5.

2. The composition of claim 1, wherein the thermoplastic polyester resin (A) is polyethylene terephthalate or polybutylene terephthalate.

3. The composition of claim 1, wherein the ethylene.1-butene random copolymer (C) contains units derived from 1-butene in an amount of 7 to 13 mol % and has a glass transition temperature of −55° C. or less, an intrinsic viscosity [η] of 1.5 to 3.0 dl/g and a crystallinity of 20% or less.

4. The composition of claim 1, wherein the ethylene.1-butene random copolymer (D) contains units derived from 1-butene in an amount of 18 to 22 mol % and has a glass transition temperature of −60° C. or less, an intrinsic viscosity [η] of 1.5 to 3.0 dl/g and a crystallinity of 8% or less.

5. The composition of claim 1, wherein the amount of graft units contained in the graft modified mixture (B) is 0.1 to 5% by weight.

6. The composition of claim 1, wherein the unsaturated carboxylic acid and derivative thereof are selected from maleic acid, nadic acid, maleic anhydride and nadic anhydride.

7. The composition of claim 1, wherein the graft modified mixture (B) is obtained by subjecting a mixture of the copolymer (C) and the copolymer (D) to a graft reaction.

8. The composition of claim 1, wherein the graft modified mixture (B) contains the copolymer (C) and the copolymer (D) in a weight ratio ((C)/(D)) of 15/85 to 90/10.

9. Use of the composition of claim 1 as a material for molded articles.

* * * * *